(12) United States Patent
Maeding

(10) Patent No.: US 11,719,194 B2
(45) Date of Patent: Aug. 8, 2023

(54) COMBUSTION CHAMBER WITH VIBRATION DAMPING INNER WALL SHAPE AND METHOD FOR MANUFACTURING A COMBUSTION CHAMBER

(71) Applicant: ArianeGroup GmbH, Taufkirchen (DE)

(72) Inventor: Chris Udo Maeding, Unterschleißheim (DE)

(73) Assignee: ARIANEGROUP GMBH, Taufkirchen (DE)

( * ) Notice: Subject to any disclaimer, the term of this patent is extended or adjusted under 35 U.S.C. 154(b) by 0 days.

(21) Appl. No.: 17/463,609

(22) Filed: Sep. 1, 2021

(65) Prior Publication Data

US 2022/0090563 A1 Mar. 24, 2022

(30) Foreign Application Priority Data

Sep. 21, 2020 (DE) .......................... 102020124542.4

(51) Int. Cl.
*F02K 9/64* (2006.01)
*F02K 9/62* (2006.01)

(52) U.S. Cl.
CPC .................. *F02K 9/64* (2013.01); *F02K 9/62* (2013.01)

(58) Field of Classification Search
CPC ....................................... F02K 9/62; F02K 9/64
See application file for complete search history.

(56) References Cited

U.S. PATENT DOCUMENTS 2,217,649 A * 10/1940 Goddard .................. F02K 9/62
60/915
2,395,406 A * 2/1946 Goddard .................. F02K 9/52
60/260

(Continued)

FOREIGN PATENT DOCUMENTS

DE 102017106758 A1 9/2018
JP 2005226586 A 8/2005

(Continued)

OTHER PUBLICATIONS

Zhang, T. and Miyamoto, C.M., "3D Printing: A Cost Effective and Timely Approach to Manufacturing of Low-Thrust Engines", AIAA-2014-3502, 50th AIAA/ASME/SAE/ASEE Joint Propulsion Conference, Jul. 28-30, 2014, pp. 1-23. (Year: 2014).*

(Continued)

*Primary Examiner* — Lorne E Meade
(74) *Attorney, Agent, or Firm* — Taft Stettinius & Hollister LLP

(57) ABSTRACT

A combustion chamber for a rocket engine, the combustion chamber including a combustion chamber body enclosing a combustion chamber volume and a nozzle portion tapering in a longitudinal direction of the combustion chamber and adjoining the combustion chamber body. The combustion chamber body has at least one first portion and a second portion, wherein an inner surface of the at least one first portion facing the combustion chamber volume is closer to a cross-sectional center of the combustion chamber body than an inner surface of the second portion of the combustion chamber body. Furthermore, a additive layer manufacturing method for manufacturing such a combustion chamber is described.

17 Claims, 5 Drawing Sheets

(56) References Cited

U.S. PATENT DOCUMENTS

Figure 1:
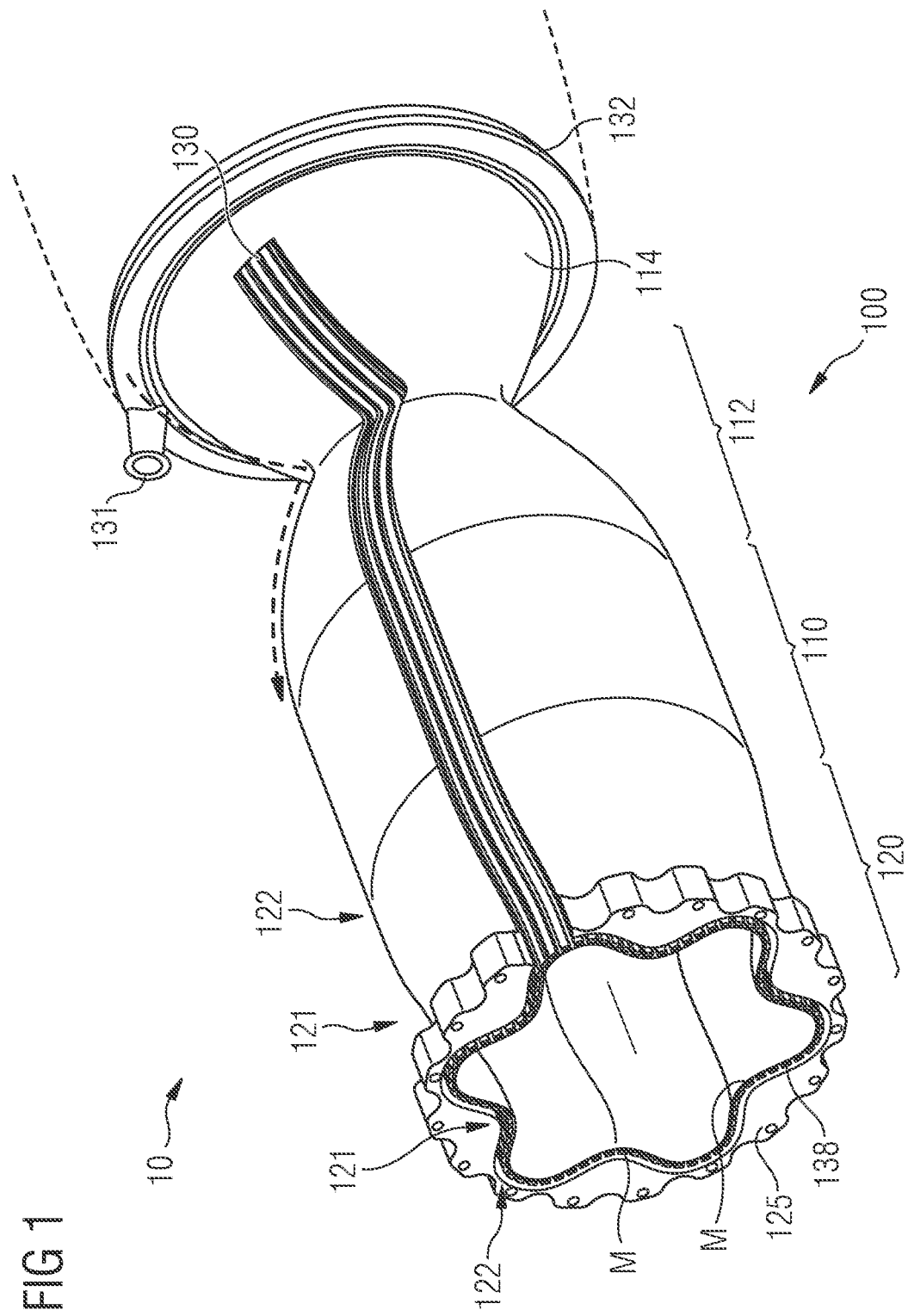

| | | | | |
|---|---|---|---|---|
| 2,397,658 A | * | 4/1946 | Goddard | F02K 9/64 60/260 |
| 2,476,185 A | | 7/1949 | Goddard | |
| 2,968,918 A | * | 1/1961 | Denison, Jr. | F02K 9/52 60/260 |
| 3,066,702 A | * | 12/1962 | Tumavicus | F02K 9/64 138/147 |
| 3,182,448 A | * | 5/1965 | Rabe | F02K 9/64 60/260 |
| 3,235,947 A | * | 2/1966 | Sohlemann | F02K 9/64 228/183 |
| 5,546,656 A | * | 8/1996 | Hartman | F02K 9/64 29/890.038 |
| 6,640,538 B1 | * | 11/2003 | Preclik | F02K 9/64 239/127.3 |
| 2020/0095956 A1 | | 3/2020 | Ortelt et al. | |

FOREIGN PATENT DOCUMENTS

| | | |
|---|---|---|
| JP | 2009209862 A | 9/2009 |
| JP | 2019534409 A | 11/2019 |
| WO | 2018045351 | 3/2018 |

OTHER PUBLICATIONS

German Patent Office, English Translation of Office Action issued in corresponding Application No. 102020124542.4, dated Apr. 22, 2021, 8 pp.

German Patent Office, Office Action issued in corresponding Application No. 102020124542.4, dated Apr. 22, 2021, 8 pp.

Gebhardt, A., "Generative Fertigungsverfahren," 4. Auglage, Munchen, Carl Hanser Verlag, 2013. S. 21 bis 37.—ISBN 978-3-446-43652-7, 19 pp.

JP Patent Office, JP Examination Report issued in corresponding JP Application No. 2021-149221, dated Aug. 25, 2022, 8 pgs.

* cited by examiner

FIG 4
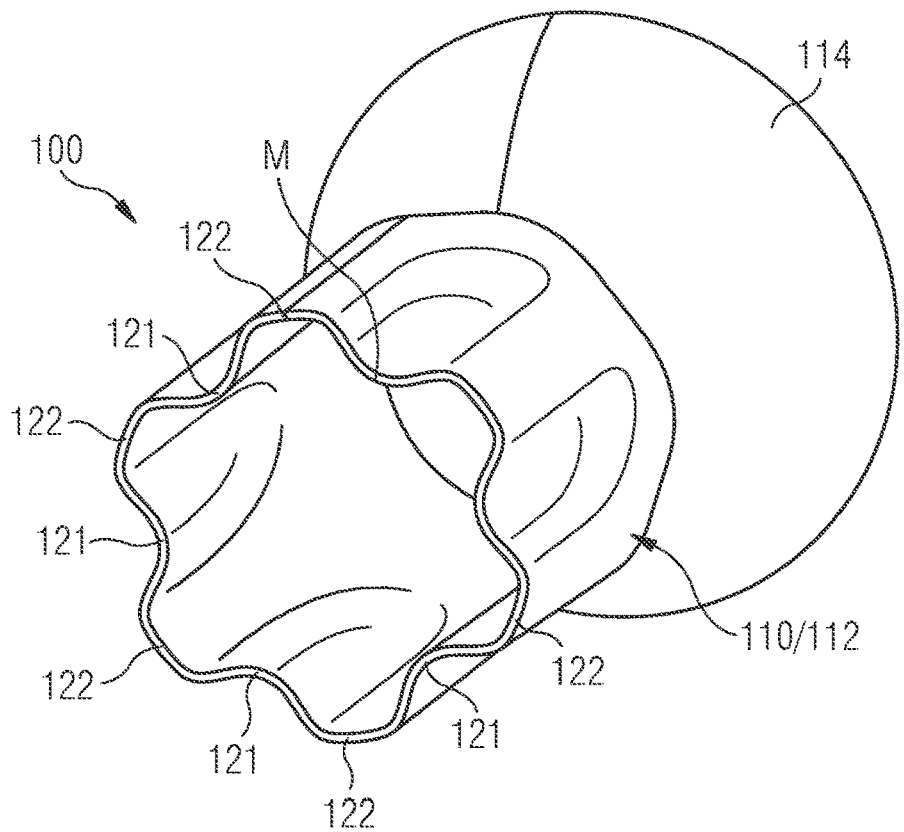
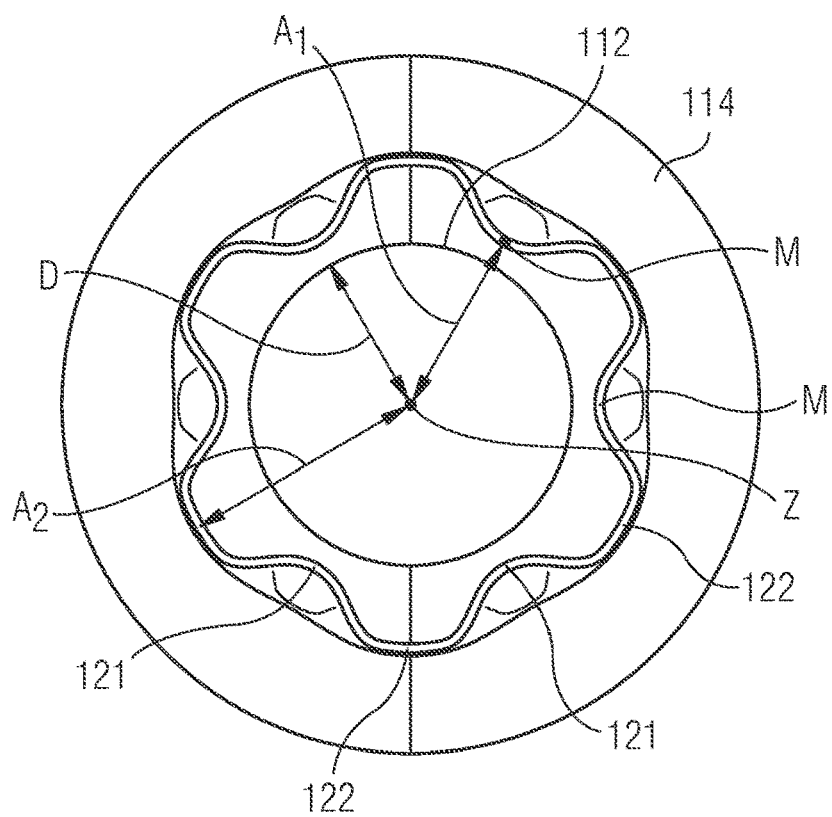

FIG 5
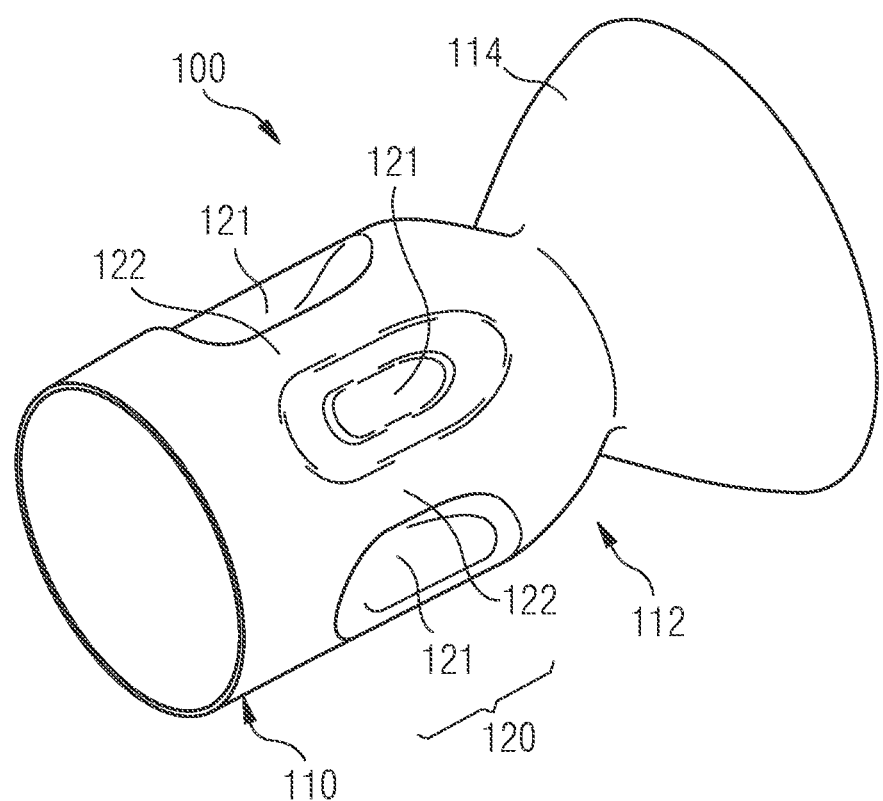
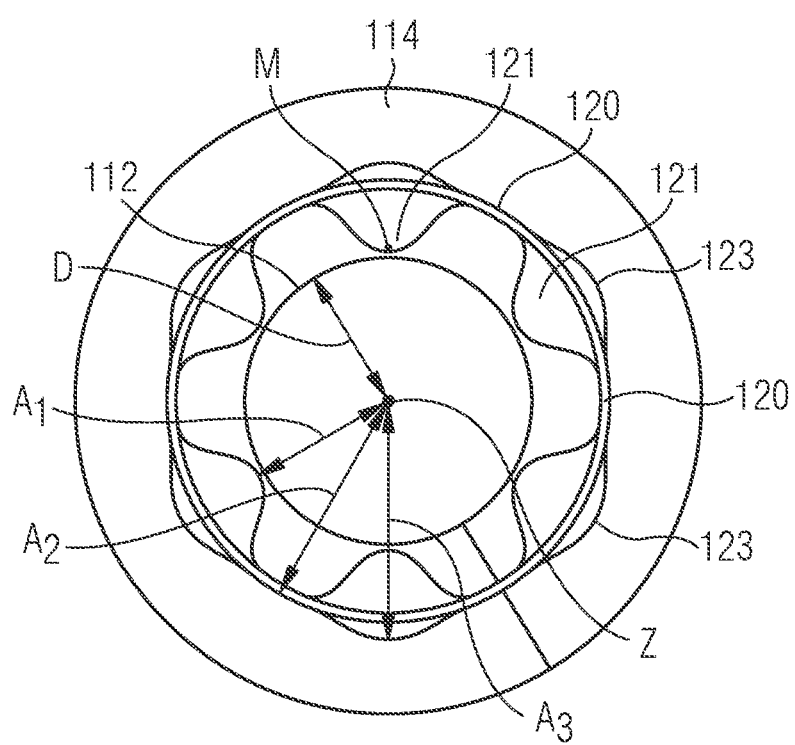

COMBUSTION CHAMBER WITH VIBRATION DAMPING INNER WALL SHAPE AND METHOD FOR MANUFACTURING A COMBUSTION CHAMBER

The invention relates to a combustion chamber having a vibration-damping inner wall shape, and to a rocket engine having such a combustion chamber, and to a method for manufacturing such a combustion chamber, as well as to a computer-readable medium having instructions for carrying out the manufacturing method. In particular, the invention relates to a combustion chamber, comprising a combustion chamber body having at least one portion whose inner side is closer to a cross-sectional center of the combustion chamber body than another portion of the combustion chamber body. Further described are a rocket engine having such a combustion chamber and an additive layer manufacturing method for fabricating such a combustion chamber, as well as a computer-readable medium having instructions for performing the additive layer manufacturing method.

Combustion chambers of liquid rocket engines are used for efficient combustion of the respective fuel pairing consisting of oxidizer and fuel. For this purpose, the fuel components are fed into the chamber via a special injection system. In the chamber, depending on the respective operating conditions, evaporation, mixing as well as chemical conversion and the incipient conversion into kinetic energy, the main increase of which is in the area of a subsonic and supersonic nozzle region, then takes place. The flow in the area of the combustion chamber is characterized by turbulent mixing. For reliable operation of the rocket engine, high combustion stability is desirable.

Furthermore, cooling is necessary in particular in the area of the hot gas walls (inner walls of the combustion chamber and thrust nozzle). For example, in the case of regenerative cooling, the high heat generation can be damped via coolant channels in the hot gas walls through which at least one fuel component flows.

From the various shapes for combustion chambers, such as spherical, pear-shaped, conical, cylindrical or also in the form of an annular combustion chamber, the cylindrical combustion chamber configuration has become established. A cylindrical combustion chamber has advantages, particularly in production. However, combustion chambers with a round cross-section are more susceptible to high-frequency vibrations, especially transversale vibration modes, which correspond to the natural frequencies of these designs. These transversal vibrations, i.e. vibration propagation in the radial direction of the round combustion chamber, lead to additional energy release in the combustion chamber with associated overheating. Furthermore, there is a strong pressure fluctuation.

To counteract or avoid these vibrations, baffles have been arranged on the face plate (or injection plate) of the combustion chamber. In DE 10 2016 209 650 A1, instead of baffles, it is proposed to provide a certain number of coaxial injection elements on the face plate with a central sleeve body that protrudes further from the face plate into the interior of the combustion chamber than the other injection elements. The axial staggering of the flame front in the combustion chamber achieved in this way reduces or prevents the formation and/or propagation of vibrations in a similar way to baffles.

Against this background, the object of the present invention is to provide a combustion chamber with improved combustion stability.

This object is solved by a combustion chamber with the features of claim 1, a rocket engine with the features of claim 10, as well as a method with the features of claim 11 and a corresponding data medium with instructions according to claim 13.

According to a first aspect to better understand the present disclosure, a combustion chamber for a rocket engine comprises a combustion chamber body enclosing a combustion chamber volume and a nozzle portion tapering in a longitudinal direction of the combustion chamber and adjoining the combustion chamber body. For example, the combustion chamber body is adjoining an injection head at a side opposite the nozzle portion. The combustion chamber volume is thus primarily used for mixing and combustion of the fuel components.

The combustion chamber body comprises at least one first portion and further comprises a second portion, wherein an inner side of the at least one first portion facing the combustion chamber volume is closer to a cross-sectional center of the combustion chamber body than an inner side of the second portion of the combustion chamber body. In other words, the inner surface of the at least one first portion is further inside the combustion chamber volume than the inner surface of the second portion, thereby reducing the combustion chamber volume in that region of the combustion chamber body. The at least one first portion may be any number of portions or regions of the combustion chamber body that locally define a smaller combustion chamber volume than in the region of the second portion. The second portion may be any remaining portions or regions of the combustion chamber body that are not included in the at least one first portion. Also, the second portion may be a uniformly shaped body having a bulge (extending into the combustion chamber volume) on the inner side facing the combustion chamber volume in each of the regions of the at least one first portion.

This special shape of the inside of the combustion chamber body divides the combustion chamber volume into different areas. This subdivision counteracts the generation and/or propagation of vibrations, in particular transversal vibrations. Similar to baffles arranged on the injection head, the combustion chamber volume is subdivided, especially when looking at a cross section of the combustion chamber body, so that the propagation of vibrations is damped or prevented. This increases the combustion stability of the rocket engine.

For example, several first portions of the combustion chamber body can be provided and each arranged where a baffle would normally be located. Due to the special shape of the combustion chamber body, the combustion chamber does not have any preferred natural frequencies, so that the vibration problem does not occur or is at least greatly reduced.

In an implementation variant, a distance of the inner side of the at least one first portion to the cross-sectional center of the combustion chamber body may continuously increase in the longitudinal direction and/or in the circumferential direction of the combustion chamber body from a minimum to a distance of the inner side of the second portion of the combustion chamber body to the cross-sectional center of the combustion chamber body. For example, the inner surface of the at least one first portion may adopt a round three-dimensional shape. By avoiding sharp edges, as is sometimes the case with baffles, strong temperature gradients and/or vortices in the flow can be avoided and thus areas with temperature peaks in the combustion chamber body can be avoided.

The continuous surface profile of the inside of the at least one first portion can also provide a combustion chamber volume optimized for the flow of the combustion gases. Thus, the advantages of baffles can be realized directly in the combustion chamber body, while in addition the flow in the longitudinal direction of the combustion chamber body (in the flow direction of the combustion gases) is improved. For example, turbulence can occur in the edge regions of baffles, which does not occur or occurs only to a very small extent in the combustion chamber body disclosed here.

The cross-sectional center of the combustion chamber body may correspond to a center of gravity of the cross-section of the combustion chamber body. The cross-section lies in a (cross-sectional) plane substantially perpendicular to a longitudinal direction of the combustion chamber corresponding to the flow direction of the combustion gases. The distance of the inner side of the at least one first portion or the second portion to the cross-sectional center is measured in the cross-sectional plane. The minimum is thus the shortest distance between the cross-sectional center and any point on the line of intersection of the inner side of the first portion with the plane.

In a further implementation variant, the minimum of the distance of the inner side of the at least one first portion to the cross-sectional center of the combustion chamber body may be arranged along a line extending in the longitudinal direction and/or in the circumferential direction of the combustion chamber body. When viewed in the circumferential direction, which is preferably in the cross-sectional plane, the minimum is thus not limited to a single point, but may also represent a circular arc line with equal distances to the cross-sectional center. When viewed in the longitudinal direction of the combustion chamber body, the first portion may have a point or line in each of a plurality of adjacent cross-sectional planes that are equidistant from the cross-sectional center. Thus, the minimum can be a single point, a line, but also an area where the inner wall or interior surface of the first portion is closest to the cross-sectional center, thus most reducing the combustion chamber volume. This line or area does not have to be straight, but can extend in the longitudinal direction and/or circumferential direction of the combustion chamber body.

This special shape of the first portion of the combustion chamber body allows the combustion chamber volume to be optimized for the flow of the combustion gases. In particular, the size of the first portion in the longitudinal direction and/or in the circumferential direction of the combustion chamber body can be adapted to the combustion gases used, and thus the chemical reaction, as well as the optimum mixing. In this context, the average local Mach number in the respective area of the combustion chamber volume can also be taken into account in the selection of the size of the first portion and/or the selection of the size of the minimum. Vibrations in the longitudinal direction of the combustion chamber body (longitudinal vibrations) can also be damped or prevented.

In a still further implementation variant, at least one cross-section of the combustion chamber body may be rotationally symmetrical and the cross-sectional center of the combustion chamber body may be the center of rotation of the rotational symmetry. By rotationally symmetrical is meant here not the special case of a circle, but (viewed in the circumferential direction) the arrangement of a plurality of first portions and between them the second section, each first portion recurring in the cross-section at a fixed angle about the center of rotation of the rotational symmetry. Thus, there is an N-fold rotational symmetry, where N is the number of first portions in the cross-section.

In another implementation variant, the at least one first portion of the combustion chamber body may be located in the longitudinal direction of the combustion chamber body in an area of the combustion chamber body that forms a head end of the combustion chamber body. The head end of the combustion chamber body is the end at which the injection head is connected to the combustion chamber. Thus, the arrangement of the at least one first portion corresponds approximately to the location of baffles in conventional combustion chambers.

Alternatively or additionally, the at least one first portion of the combustion chamber body may be located in the longitudinal direction of the combustion chamber body in an area of the combustion chamber body that forms a nozzle end of the combustion chamber body adjacent to the nozzle portion. The nozzle end of the combustion chamber body is opposite to the head end (as viewed in the longitudinal direction of the combustion chamber body).

Alternatively or additionally, the at least one first portion of the combustion chamber body may be located in the longitudinal direction of the combustion chamber body in a region of the combustion chamber body that forms a middle region between the head end and the nozzle end of the combustion chamber body. Thus, the head end and the nozzle end of the combustion chamber body can assume a usual shape (in particular a usual cross-section) of a combustion chamber, while, viewed in the longitudinal direction of the combustion chamber body, constrictions of the combustion chamber volume by the at least one first portion are arranged in the central region.

Further alternatively, the at least one first portion of the combustion chamber body may extend in a longitudinal direction of the combustion chamber body throughout the combustion chamber body.

In a further implementation variant, the combustion chamber body can comprise an even number of first portions. This results in a particularly symmetrical and thus stable combustion chamber body.

Alternatively or additionally, at least two first portions may be arranged in the combustion chamber body in the longitudinal direction of the combustion chamber body. The two first portions or the plurality of first portions may be arranged along a straight line that is parallel to the longitudinal direction of the combustion chamber body. Alternatively, the plurality of first portions may be arranged along a curved path, the curved path extending along a virtual inner side of a base body of the combustion chamber body defined by the second section.

In still another implementation variant, the combustion chamber may further comprise a cylindrical portion extending in the longitudinal direction of the combustion chamber. In particular, the inner surface of the combustion chamber has a cylindrical shape in the cylindrical section. In other words, a portion of the combustion chamber may be made in a conventional shape (cylindrical), while only a certain portion is made by the combustion chamber body having the particular shape defined by the at least one first portion and the second portion, as viewed in the longitudinal direction of the combustion chamber. For example, the cylindrical portion may be adjacent to the nozzle portion, thereby providing efficient flow through the combustion chamber.

Alternatively or additionally, the combustion chamber can also comprise a nozzle supersonic segment adjoining the nozzle portion in the longitudinal direction of the combustion chamber. Such a nozzle supersonic segment is also found in conventional combustion chambers or thrust chambers.

In another implementation variant, a plurality of coolant channels can be arranged in the combustion chamber body, and in particular in the at least one first portion and the second portion of the combustion chamber body, which extend in the longitudinal direction of the combustion chamber body. In this case, the coolant channels are arranged as close as possible to the inner side of the combustion chamber body in order to sufficiently cool the inner side of the combustion chamber body heated by the combustion gases. One of the fuel components can be passed through the coolant channels, which thereby heats up advantageously for the subsequent combustion.

In a further implementation variant, each of the coolant channels in the combustion chamber body can have a coolant outlet. In this case, another coolant outlet of an adjacent coolant channel in the combustion chamber body can be arranged in the circumferential direction along a cross-section of the combustion chamber body adjacent to one of the coolant outlets. In other words, the coolant outlets (the coolant channel outlets) form a chain along the circumference of the cross-section of the combustion chamber body. These can open into a circumferential collecting space (manifold).

In still another implementation variant, the combustion chamber body may have a substantially uniform wall thickness throughout. In other words, the outer surface or outer wall of the combustion chamber body forms a recess or indentation in the region of the at least one first portion. Alternatively, at least in certain portions of the combustion chamber body, the wall thickness may increase in the regions of the at least one first portion such that the exterior or outer wall of the combustion chamber body forms a flush surface with the second portion of the combustion chamber body.

In another implementation variant, the combustion chamber body can be formed in one piece. Formed in one piece means here that at least most of the parts of the combustion chamber body, such as the inner wall, outer wall and the webs separating the coolant channels between the inner wall and outer wall, consist of a continuous cohesive material. For example, the combustion chamber body or the entire combustion chamber can be manufactured using an additive layer manufacturing method (also referred to as 3D printing or ALM). Also, only parts of the combustion chamber body can be manufactured using an an additive layer manufacturing method and built on top of a section of the combustion chamber body manufactured elsewhere. Different materials can also be used in the additive layer manufacturing method. For example, a more heat-resistant material can be used on the inside of the combustion chamber body than is the case on an outside of the combustion chamber body.

According to a second aspect to better understand the present disclosure, a rocket engine comprises a combustion chamber according to the first aspect or any of the implementation variants described with respect thereto.

According to a third aspect to better understand the present disclosure, a method of manufacturing a combustion chamber according to the first aspect or any implementation variant thereof comprises an additive layer manufacturing method. In the case of the presence of coolant channels in the combustion chamber body, no material can be joined by the additive layer manufacturing method at positions where the coolant channels of the combustion chamber body are located.

According to a fourth aspect to better understand the present disclosure, a computer-readable medium comprises instructions that, when executed on a processor, cause a machine to perform the additive layer manufacturing method according to the third aspect. These instructions may be CAD data or similar data that describe or define the shape of the combustion chamber or combustion chamber body according to the first aspect, particularly such that a machine can form the combustion chamber section and/or combustion chamber layer by layer.

The above described implementation variants and examples can of course be combined without this being explicitly described. Each of the described implementation variants is thus optional to any implementation variant or already combinations thereof. Thus, the present disclosure is not limited to the individual implementation variants and examples in the order described or any particular combination of the aspects and implementation variants.

Figure 2:
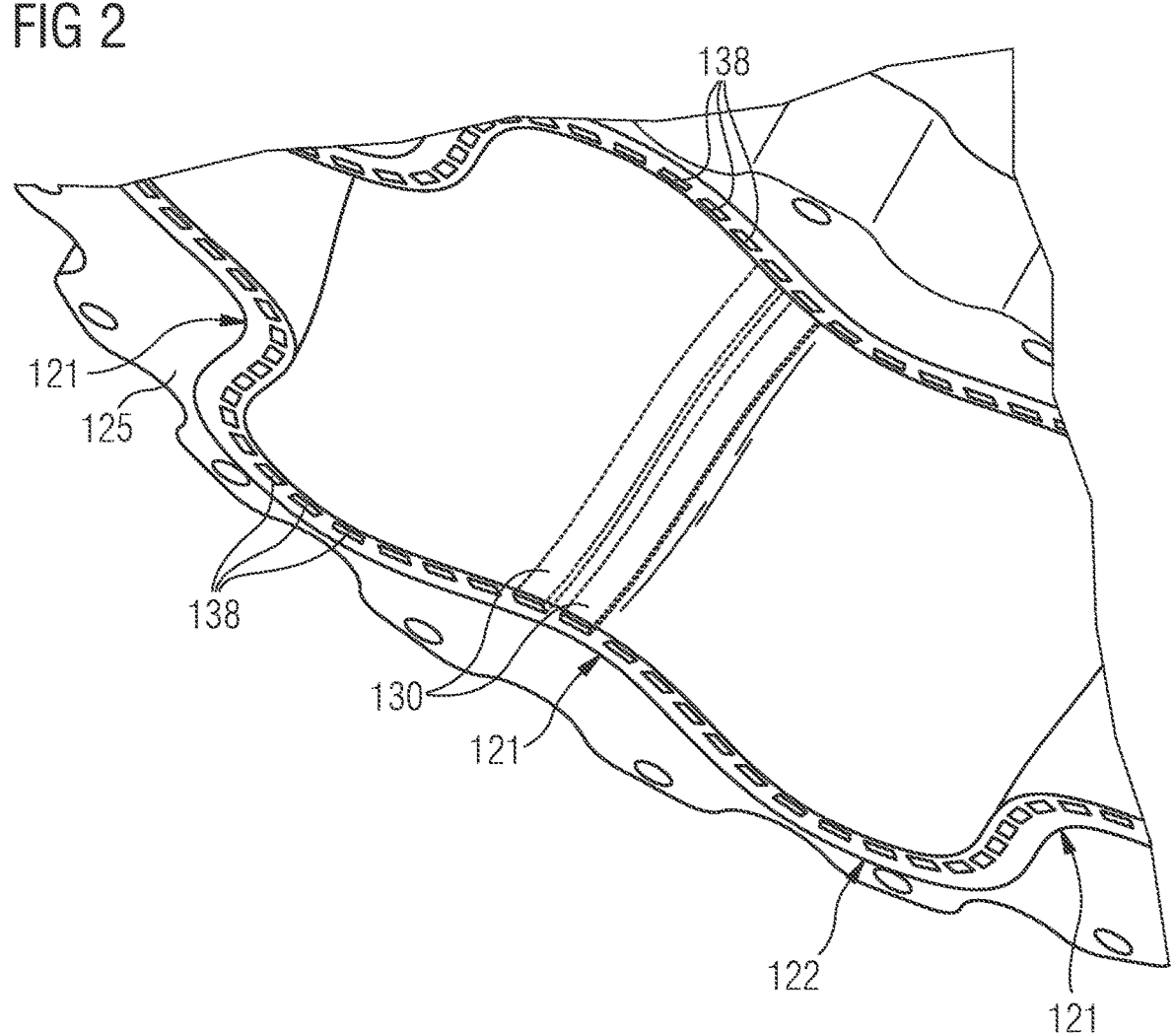
Figure 3:
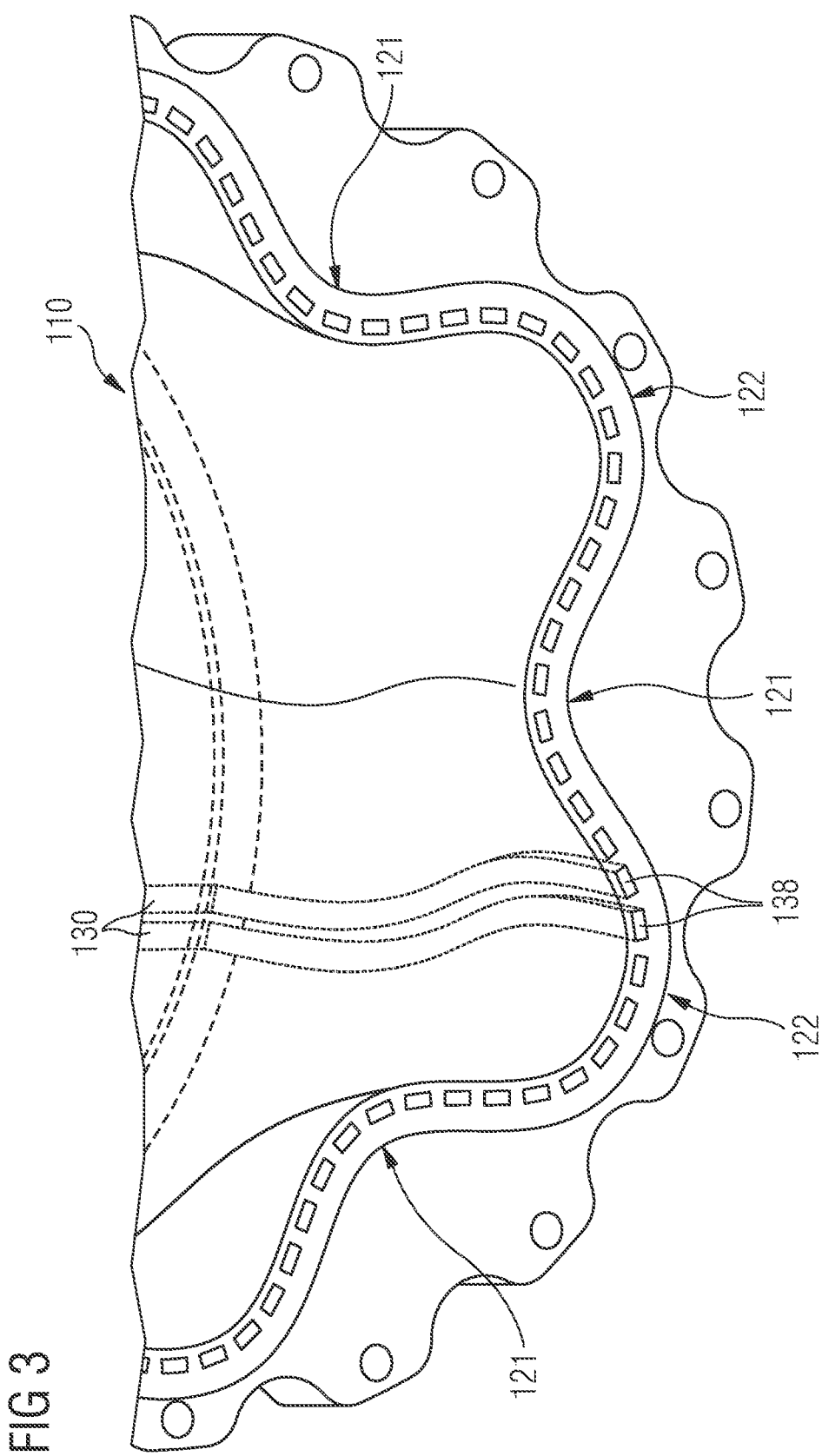

Preferred embodiments of the invention will now be explained in more detail with reference to the accompanying schematic drawings, wherein FIG. 1 schematically shows a perspective view of a combustion chamber;

FIG. 2 schematically shows a section of a combustion chamber body;

FIG. 3 schematically shows another section of a combustion chamber body;

FIG. 4 schematically shows a perspective view and a top view of a combustion chamber; and FIG. 5 schematically shows a perspective view and a top view of a differently designed combustion chamber.

FIG. 1 shows a schematic perspective view of a combustion chamber 100 which can be used, for example, in a rocket engine 10. The nozzle of the rocket engine 10 is merely indicated by dashed lines on the right in FIG. 1. The combustion chamber 100, as simplified in FIG. 1, includes a combustion chamber body 120 that encloses a combustion chamber volume in which much of the mixing and combustion of the propellant components occurs. Downstream (in the direction of flow of the combustion gases) of the combustion chamber body 120 is an optional combustion chamber portion 110 and a subsonic nozzle portion 112 in which the combustion gases are accelerated, followed by a nozzle supersonic segment 114.

In the area of the nozzle supersonic segment 114, there is a connection 131 for coolant which opens into a distribution ring 132 (also called a distribution manifold). The distribution ring 132 extends in the circumferential direction and forms a continuous annular volume. Coolant channels 130 open into this volume or, viewed in the direction of coolant flow (indicated by a dashed arrow in FIG. 1), a plurality of coolant channels 130 begin in the distribution ring 132.

Coolant channels 130 are also disposed in the combustion chamber portion 110 and the combustion chamber body 120, such that the coolant channels 130 of the nozzle supersonic segment 114 continue to the head end of the combustion chamber 100 (left end of the combustion chamber 100 in FIG. 1). For clarity, only some of the coolant channels 130 are shown exposed in FIG. 1, and only in a region spaced from the distribution ring 132. Of course, the coolant channels 130 extend to the distribution ring 132 in the region of the nozzle supersonic segment 114.

A flange 125 is provided at the upstream end of the combustion chamber 100 as viewed in the direction of flow of the combustion gases. This flange 125 is used to connect the combustion chamber head (not shown). As shown in the detailed view in FIGS. 2 and 3, a plurality of coolant outlets 138 are located in the region of the flange 125, each coolant channel 130 in the combustion chamber body 120 having one such coolant outlet 138. The coolant outlets 138 are arranged adjacent to each other in a circumferential direction along a cross-section of the combustion chamber body 120. The coolant outlets 138 may open into a distribution ring or collector ring (manifold), not shown, provided corresponding to the distribution ring 132 at the other end of the combustion chamber 100.

The combustion chamber portion 110, shown cylindrically in FIG. 1, may assume any cross-sectional shape that serves to efficiently combust the fuel components. The combustion chamber portion 110 is shown in FIG. 1 in particular to illustrate a possible basic body of the combustion chamber 100. This possible (virtual) basic body of the combustion chamber 100 is also found, at least in some areas, in the combustion chamber body 120.

Deviating from this main body, the combustion chamber body 120 has at least a first portion 121 and a second portion 122. These two portions 121, 122 are clearly visible in the detailed views of FIGS. 2 and 3. An inner side of the at least one first portion 121 facing the combustion chamber volume is closer to a cross-sectional center of the combustion chamber body 120 than an inner side of the second portion 122 of the combustion chamber body 120. In FIG. 1, a combustion chamber body 120 having a total of six first portions 121 is shown. However, the number of first portions 121 can be any number and can be an even number or an odd number.

The first portions 121 shown in FIG. 1 have a minimum distance M (minimum) to a cross-sectional center of the combustion chamber body 120. From this minimum M, the distance of the inner side of the at least one first portion 121 to the cross-sectional center of the combustion chamber body 120 changes continuously in longitudinal direction and in circumferential direction up to a distance of the inner side of the second portion 122 of the combustion chamber body 120 to the cross-sectional center. Thus, this distance of the inner side to the cross-sectional center continuously increases. As a result, the combustion chamber volume is divided into certain regions, with the first portions 121 representing a constriction. These constricted areas perform a similar task to baffles arranged on an injection head (not shown). However, a flow-optimized surface is created by the continuous course of the inside of the combustion chamber body 120.

Depending on the type of fuel, vibrations may be generated in the combustion chamber volume that have different parameters. To counteract the vibrations, the at least one first portion 121 and the second portion 122 are dimensioned in the longitudinal direction and/or the circumferential direction of the combustion chamber body 120 such that the vibrations that would otherwise occur are damped or suppressed.

When viewed in the longitudinal direction of the combustion chamber body 120, the coolant channels 130 may pass through both the first portions 121 and the second portion 122. Due to the change in the inner surface between the first portion 121 and the second portion 122, the coolant channels 130 may also have different cross-sectional shapes. For example, the coolant channels 130 in the first portion 121 may be wider when viewed in the circumferential direction to accommodate the increasing surface area (also viewed in the circumferential direction). Advantageously, the cross-sectional area of each coolant channel 130 does not change or changes only slightly from the nozzlee end (right in FIG. 1) to the head end (left in FIG. 1).

The combustion chamber body 120 (or the entire combustion chamber 100) can be fabricated in a layer-by-layer process or using an additive layer manufacturing method (3D printing or ALM) quite quickly and easily. The material forming the at least one first portion 121 and the second portion 122 can be applied in layers, and the entire combustion chamber 100 can be fabricated in layers. In this regard, all of the coolant channels 130 can be fabricated by omitting joining of material and thus creating a cavity.

The additive layer manufacturing method allows the cavities forming the coolant channels 130 to be produced in a simple manner. As a result, complex structures can also be realized, in particular in the transition area between combustion chamber portion 110 and combustion chamber body 120 and/or in the area of continuous change of the interior surface of combustion chamber body 120 in the area of the at least one first portion 121 and second portion 122, which would not be possible with other manufacturing processes. Thus, combustion chamber bodies 120 that can be well cooled and flow-optimized can be provided in a simple process, whereby particular attention can be paid to good vibration damping, regardless of a changing course of the coolant channels 130.

FIGS. 4 and 5 schematically show perspective views and elevations of two combustion chambers 100. In the example shown in FIG. 4, the first portions 121 of the combustion chamber body 120 are provided at the head end of the combustion chamber 100. The minimum M of the distance A1 of the inner side of the first portion 121 to the cross-sectional center Z is located, for example, at the head end of the combustion chamber 100. The distance (starting from A1) increases continuously along the longitudinal direction and circumferential direction of the combustion chamber body 120 until it reaches the distance A2 of the inner side of the second portion 122 to the cross-sectional center Z. Of course, the minimum M may be present not only at a point, but also along a line (for example, extending in the longitudinal direction) or in an area.

In the views of FIGS. 4 and 5 (looking in the longitudinal direction of the respective combustion chamber 100), it can further be seen that the combustion chamber volume tapers in the region of the nozzle portion 112, in particular, the cross-section of the combustion chamber 100 tapers up to the nozzle portion diameter D.

In the example according to FIG. 5, first portions 121 are also provided which cause a reduction of the combustion chamber volume. However, these first portions 121 are located in a central region, viewed in the longitudinal direction of the combustion chamber 100, i.e. between the head end (left in FIG. 5) and the nozzle end (right in FIG. 5) of the combustion chamber body 120. The remaining region of the combustion chamber body 120 surrounding the first portions 121 represents a basic body in the form of the second portion 122. In the head-side region as well as in the nozzle-side region, it is therefore also possible to speak of a combustion chamber portion 110 which has the shape of a conventional combustion chamber (here a cylindrical combustion chamber shape).

The arrangements of the at least one first portion 121 shown in FIGS. 4 and 5 are merely exemplary. While in FIG. 5 the first portions 121 are arranged along one ring, several first portions 121 may of course be arranged along two rings in the combustion chamber body 120. In this case, the first portions 121 along one ring may be arranged rotated with respect to the first portions 121 of another ring, as viewed in the circumferential direction of the combustion chamber body 120. Likewise, it is conceivable that the first portions do not extend along the longitudinal direction of the combustion chamber body 120, as is the case, for example, in FIGS. 4 and 5. Rather, the first portions 121 may also extend along a curved line. This allows, for example, a rotational component to be included in the flow of the combustion gases or also to be reduced.

Further, as shown in FIGS. 4 and 5, the outer surface of combustion chamber body 120 may follow the path of the inner surface in both first portions 121 and second portions 122. This may allow the wall of the combustion chamber body 120 to have substantially the same thickness. Alternatively, more material may be used to make the outer surface of combustion chamber body 120 smooth and continuous.

Finally, in any of the embodiments described herein, there may be not only an indentation in the form of the at least one first portion 121, but also a bulge 123 (shown only in FIG. 5). Further, the bulge 123 may also replace the second portion 122. Such one or more bulges enable the same Mach number to be present in the region of the combustion chamber body 120 and the combustion chamber portion 110.

The invention claimed is:

1. A combustion chamber for a rocket engine, the combustion chamber comprising:
    a combustion chamber body enclosing a combustion chamber volume the combustion chamber body formed at least in part by a cylindrical basic body; and
    a nozzle portion tapering in the longitudinal direction of the combustion chamber and adjoining the cylindrical basic body of the combustion chamber body in the longitudinal direction of the combustion chamber,
    the combustion chamber body comprises at least one first portion and a second portion, wherein an inner side of the at least one first portion facing the combustion chamber volume is closer to a cross-sectional center of the combustion chamber body than an inner side of the second portion of the combustion chamber body,
    wherein the combustion chamber body has an inner wall and an outer wall forming together the combustion chamber body with a substantially uniform wall thickness in the longitudinal direction and in a circumferential direction of the combustion chamber body, so that the outer wall of the combustion chamber body forms an indentation in the region of the at least one first portion, the inner wall forming the inner sides of the first and second portions,
    wherein the combustion chamber body has a plurality of webs between the inner wall and the outer wall defining a plurality of coolant channels between the inner wall and the outer wall of the combustion chamber body, and
    the plurality of coolant channels is arranged extending in the longitudinal direction of the combustion chamber body, each of the plurality of coolant channels following the inner wall and the outer wall of the combustion chamber body through the at least one first portion and the second portion.

2. The combustion chamber according to claim 1, wherein a distance of the inner side of the at least one first portion to the cross-sectional center of the combustion chamber body increases continuously in longitudinal direction and/or in circumferential direction of the combustion chamber body from a minimum to a distance of the inner side of the second portion of the combustion chamber body to the cross-sectional center of the combustion chamber body.

3. The combustion chamber according to claim 2, wherein the minimum of the distance of the inner side of the at least one first portion to the cross-sectional center of the combustion chamber body is arranged along a line extending in the longitudinal direction and/or in the circumferential direction of the combustion chamber body.

4. The combustion chamber according to claim 3, wherein at least one cross-section of the combustion chamber body is rotationally symmetrical and the cross-sectional center of the combustion chamber body is the center of rotation of the rotational symmetry.

5. The combustion chamber according to claim 4, wherein the at least one first portion of the combustion chamber body is located in the longitudinal direction of the combustion chamber body in an area of the combustion chamber body that forms a head end of the combustion chamber body or that forms a nozzle end of the combustion chamber body adjacent to the nozzle portion or that forms a middle area between the head end and the nozzle end of the combustion chamber body, or
    wherein the at least one first portion of the combustion chamber body extends in a longitudinal direction of the combustion chamber body throughout the combustion chamber body.

6. The combustion chamber according to claim 5, wherein the combustion chamber body comprises an even number of first portions, and/or
    wherein at least two first portions are arranged in the combustion chamber body in the longitudinal direction of the combustion chamber body.

7. The combustion chamber according to claim 6, further comprising:
    a cylindrical portion extending in the longitudinal direction of the combustion chamber; and/or
    a nozzle supersonic segment adjoining the nozzle portion in the longitudinal direction of the combustion chamber.

8. The combustion chamber according to claim 1, wherein each of the coolant channels in the combustion chamber body has a coolant outlet, and wherein another coolant outlet of an adjacent coolant channel in the combustion chamber body is arranged in the circumferential direction along a cross-section of the combustion chamber body adjacent to one of the coolant outlets.

9. A rocket engine with a combustion chamber according to claim 1.

10. The combustion chamber according to claim 1, wherein the combustion chamber structure is consistent with fabrication by using an additive layer manufacturing technique.

11. The combustion chamber according to claim 1, wherein at positions where the coolant channels of the combustion chamber body are located, the structure includes no material joined by an additive layer manufacturing technique.

12. The combustion chamber according to claim 1, wherein at least one cross-section of the combustion chamber body is rotationally symmetrical and the cross-sectional center of the combustion chamber body is the center of rotation of the rotational symmetry.

13. The combustion chamber according to claim 12, wherein the at least one first portion of the combustion chamber body is located in the longitudinal direction of the combustion chamber body in an area of the combustion chamber body that forms a head end of the combustion chamber body or that forms a nozzle end of the combustion chamber body adjacent to the nozzle portion or that forms a middle area between the head end and the nozzle end of the combustion chamber body, or wherein the at least one first portion of the combustion chamber body extends in a longitudinal direction of the combustion chamber body throughout the combustion chamber body.

14. The combustion chamber according to claim 13, wherein the combustion chamber body comprises an even number of first portions, and/or
   wherein at least two first portions are arranged in the combustion chamber body in the longitudinal direction of the combustion chamber body.

15. The combustion chamber according to claim 1, wherein the combustion chamber body comprises an even number of first portions, and/or
   wherein at least two first portions are arranged in the combustion chamber body in the longitudinal direction of the combustion chamber body.

16. The combustion chamber according to claim 1, further comprising:
   a cylindrical portion extending in the longitudinal direction of the combustion chamber; and/or
   a nozzle supersonic segment adjoining the nozzle portion in the longitudinal direction of the combustion chamber.

17. The combustion chamber according to claim 1, wherein the at least one first portion of the combustion chamber body is located in the longitudinal direction of the combustion chamber body in an area of the combustion chamber body that forms a head end of the combustion chamber body or that forms a nozzle end of the combustion chamber body adjacent to the nozzle part or that forms a middle area between the head end and the nozzle end of the combustion chamber body, or
   wherein the at least one first portion of the combustion chamber body extends in a longitudinal direction of the combustion chamber body throughout the combustion chamber body.

* * * * *